(12) United States Patent
Yabe

(10) Patent No.: US 12,485,230 B2
(45) Date of Patent: Dec. 2, 2025

(54) SYRINGE WITH SAFETY MECHANISM

(71) Applicant: NIPRO CORPORATION, Osaka (JP)

(72) Inventor: Yukihiro Yabe, Osaka (JP)

(73) Assignee: NIPRO CORPORATION, Osaka (JP)

( * ) Notice: Subject to any disclaimer, the term of this patent is extended or adjusted under 35 U.S.C. 154(b) by 846 days.

(21) Appl. No.: 17/783,909

(22) PCT Filed: Dec. 9, 2020

(86) PCT No.: PCT/JP2020/045771
§ 371 (c)(1),
(2) Date: Jun. 9, 2022

(87) PCT Pub. No.: WO2021/117751
PCT Pub. Date: Jun. 17, 2021

(65) Prior Publication Data
US 2023/0001102 A1    Jan. 5, 2023

(30) Foreign Application Priority Data

Dec. 10, 2019   (JP) ................................. 2019-222815
Dec. 10, 2019   (JP) ................................. 2019-222817

(51) Int. Cl.
*A61M 5/32*    (2006.01)
(52) U.S. Cl.
CPC ............ *A61M 5/32* (2013.01); *A61M 5/3202* (2013.01); *A61M 5/3245* (2013.01); *A61M 2005/3247* (2013.01)
(58) Field of Classification Search
CPC .............. A61M 5/3272; A61M 5/3271; A61M 5/3243; A61M 5/3245
See application file for complete search history.

(56) References Cited

U.S. PATENT DOCUMENTS

| 10,004,854 | B2 * | 6/2018 | Evans .................. A61M 5/326 |
| 10,342,930 | B1 | 7/2019 | Infranger et al. |
| 2005/0165353 | A1 | 7/2005 | Pessin |

(Continued)

FOREIGN PATENT DOCUMENTS

| CA | 2 803 219 A1 | 1/2012 |
| CN | 103429286 A | 12/2013 |

(Continued)

OTHER PUBLICATIONS

Extended European Search Report dated Nov. 9, 2023 in European Application No. 20899324.6.

(Continued)

*Primary Examiner* — William R Carpenter
(74) *Attorney, Agent, or Firm* — Sughrue Mion, PLLC

(57) ABSTRACT

A safety mechanism syringe includes a syringe, a needle, a holder, and a needle cover displaceable relatively with respect to the syringe along an axial direction of the syringe from a use position toward a protection position. The holder includes a locking portion. At least one member of the holder and the needle cover includes a protruding portion that protrudes toward the other member, and the other member includes a restriction portion that abuts on the protruding portion to restrict relative displacement of the needle cover with respect to the syringe along the axial direction of the syringe from the protection position toward the use position.

7 Claims, 16 Drawing Sheets

(56) References Cited

U.S. PATENT DOCUMENTS

| | | |
|---|---|---|
| 2007/0270759 A1 | 11/2007 | Pessin |
| 2008/0077093 A1 | 3/2008 | Gratwohl et al. |
| 2008/0200881 A1 | 8/2008 | Emmott et al. |
| 2009/0118676 A1 | 5/2009 | Emmott et al. |
| 2011/0118667 A1 | 5/2011 | Zaiken et al. |
| 2012/0041368 A1 | 2/2012 | Karlsson |
| 2013/0261558 A1 | 10/2013 | Hourmand et al. |
| 2013/0289480 A1 | 10/2013 | Roberts et al. |
| 2013/0331794 A1 | 12/2013 | Ekman et al. |
| 2014/0107577 A1 | 4/2014 | Boyd et al. |
| 2014/0257193 A1 | 9/2014 | Boström et al. |
| 2015/0157808 A1 | 6/2015 | Srinivasan et al. |
| 2017/0056601 A1 | 3/2017 | Uchida et al. |
| 2018/0021524 A1 | 1/2018 | Takemoto |
| 2019/0046735 A1 | 2/2019 | Ingerslev et al. |
| 2019/0262599 A1 | 8/2019 | Nakagami et al. |
| 2020/0101236 A1 | 4/2020 | Ogawa et al. |
| 2022/0143325 A1 | 5/2022 | Yeh |

FOREIGN PATENT DOCUMENTS

| | | |
|---|---|---|
| CN | 106102807 A | 11/2016 |
| CN | 108697842 A | 10/2018 |
| CN | 109562253 A | 4/2019 |
| EP | 2 376 153 B1 | 11/2017 |
| FR | 2 874 506 A1 | 3/2006 |
| JP | 2005-520602 A | 7/2005 |
| JP | 2008-62063 A | 3/2008 |
| JP | 2008-528225 A | 7/2008 |
| JP | 2011-104363 A | 6/2011 |
| JP | 2012-525200 A | 10/2012 |
| KR | 10-2014-0050753 A | 4/2014 |
| KR | 20-2017-0003976 U | 11/2017 |
| WO | 2006/082350 A1 | 8/2006 |
| WO | 2010/126432 A1 | 11/2010 |
| WO | 2012/166527 A2 | 12/2012 |
| WO | 2016/158627 A1 | 10/2016 |
| WO | 2019/003598 A1 | 1/2019 |
| WO | 2019/061420 A1 | 4/2019 |

OTHER PUBLICATIONS

Chinese Office Action dated Oct. 30, 2023 in Chinese Application No. 202080095585.3.
Decision for Grant of Patent issued Aug. 5, 2024 in Korean Patent Application No. 10-2022-7022868.
International Search Report issued Feb. 2, 2021 in International Application No. PCT/JP2020/045771.
Office Action issued Mar. 4, 2024 in Chinese Application No. 202080095585.3.

* cited by examiner

SYRINGE WITH SAFETY MECHANISM

TECHNICAL FIELD

This invention relates to a syringe with safety mechanism.

BACKGROUND ART

For example, EP 2376153 discloses a syringe with safety mechanism, the syringe including a syringe with needle, a needle cap, an inner sleeve, and an outer sleeve. The needle cap of this syringe with safety mechanism is removed at the time of use.

CITATION LIST

Patent Literature

PTL 1: EP 2376153

SUMMARY OF INVENTION

Technical Problem

In the syringe with safety mechanism as described in EP 2376153, in order to prevent inadvertent prick or the like after use, the outer sleeve may be used as a needle cover. Specifically, the syringe with safety mechanism may be constructed such that the needle cover (outer sleeve) can be displaced (slid) toward the needle relatively with respect to the syringe as far as a protection position where the needle is surrounded, after use of the syringe. When the needle cover is slid to the protection position and thereafter the needle cover returns to a use position where the needle is exposed, however, inadvertent prick or the like may occur. In addition, if the needle cover is displaced toward the protection position due to vibration during transport or the like before use, that is, before removal of the needle cap, it becomes difficult to remove the needle cap at the time of use.

An object of the present invention is to provide a syringe with safety mechanism capable of suppressing displacement of a needle cover from a protection position to a use position.

Solution to Problem

A syringe with safety mechanism according to one aspect of this invention includes a syringe, a needle connected to a tip end portion of the syringe, a holder fixed to the syringe, and a needle cover displaceable relatively with respect to the syringe along an axial direction of the syringe from a use position where the needle is exposed toward a protection position where the needle is surrounded. The holder includes a locking portion that locks the needle cover at the use position from a radially inner side of the needle cover to hold the needle cover at the use position and locks the needle cover at the protection position from the radially inner side to hold the needle cover at the protection position. At least one member of the holder and the needle cover includes a protruding portion that protrudes toward the other member of the holder and the needle cover and the other member includes a restriction portion that abuts on the protruding portion to restrict relative displacement of the needle cover with respect to the syringe along the axial direction of the syringe from the protection position toward the use position.

Advantageous Effects of Invention

According to this invention, a syringe with safety mechanism capable of suppressing displacement of a needle cover from a protection position to a use position can be provided.

DESCRIPTION OF EMBODIMENTS

Figure 1:
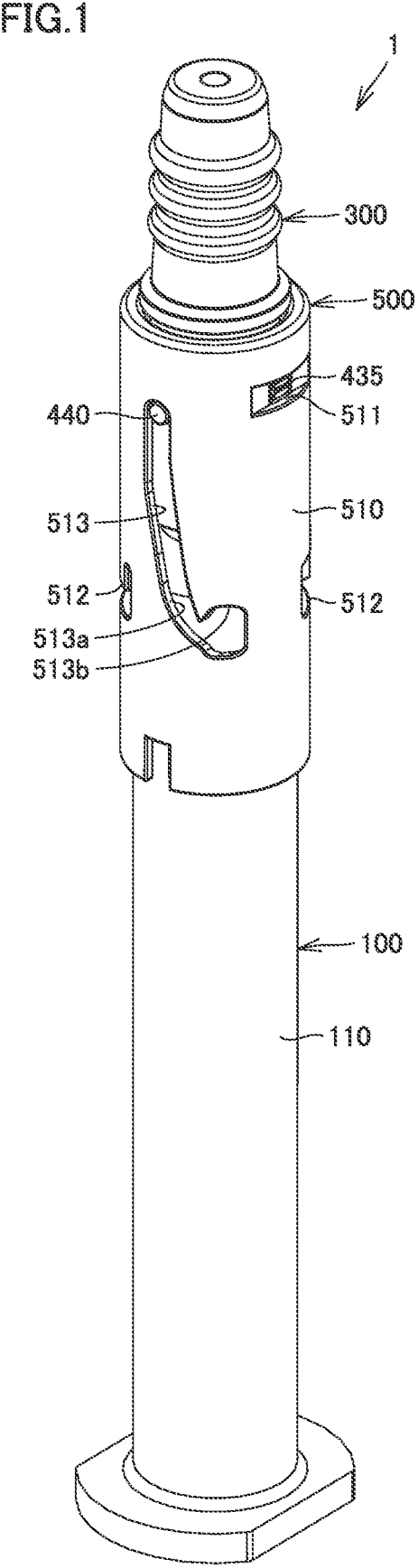
FIG. 1 is a perspective view of a syringe with safety mechanism in one embodiment of the present invention.
Figure 2:
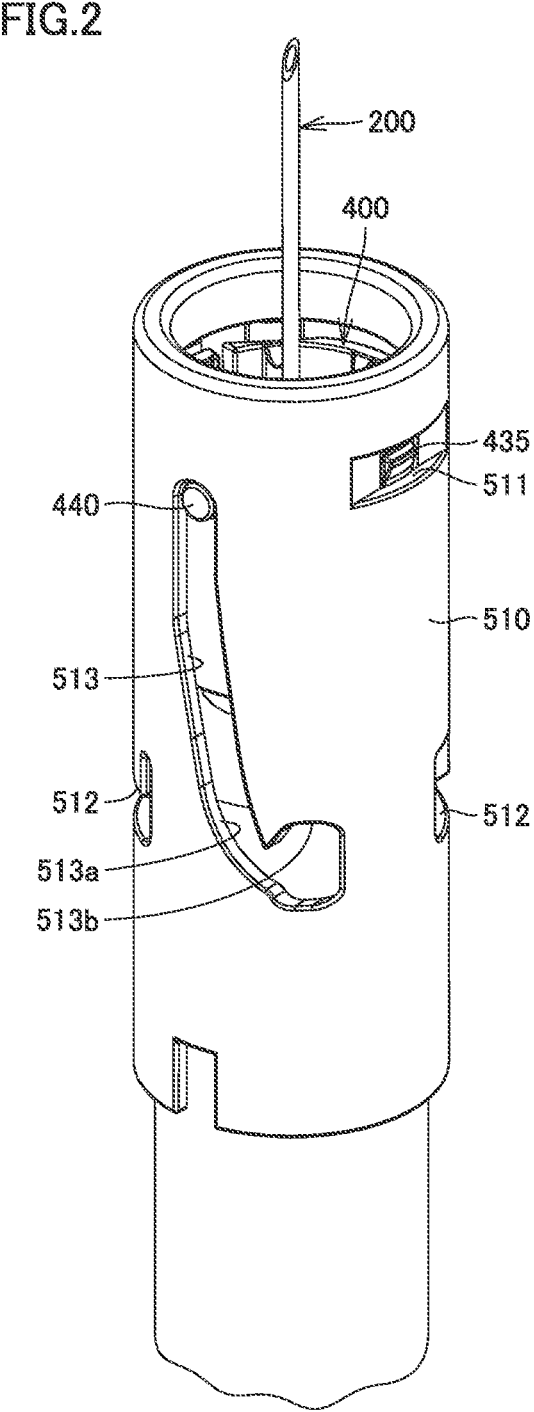
FIG. 2 is a perspective view of a state where a cap has been removed from the syringe with safety mechanism shown in FIG. 1.
Figure 3:
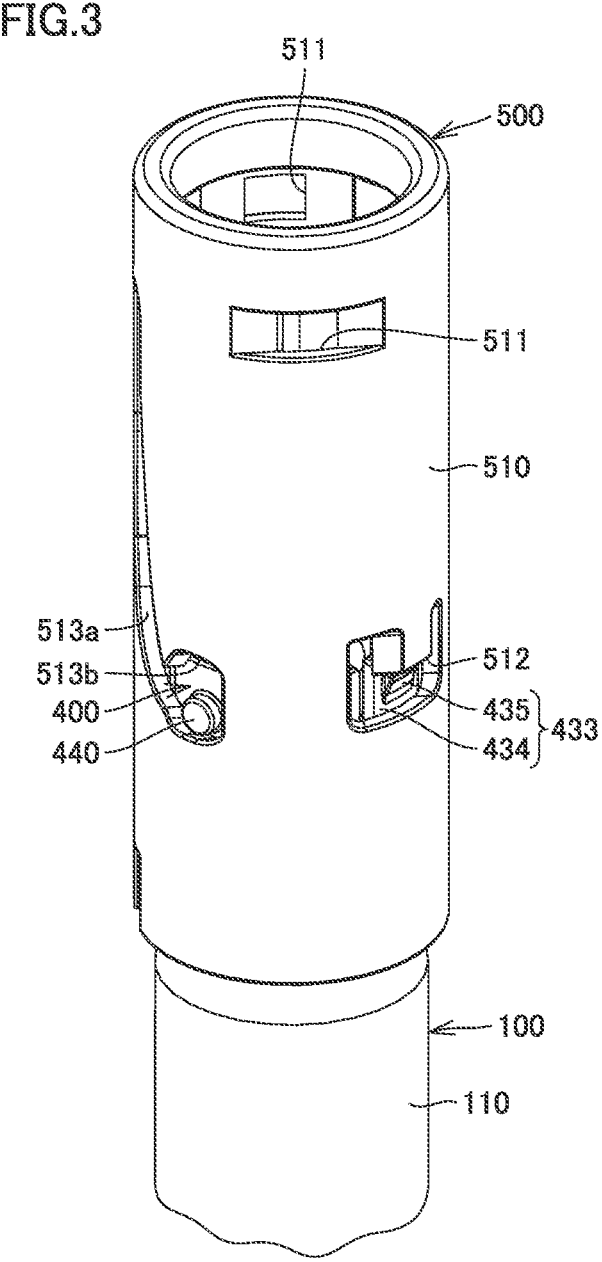
FIG. 3 is a perspective view of a state where a needle cover is located at a protection position.

An embodiment of this invention will be described with reference to the drawings. The same or corresponding members in the drawings referred to below have the same reference characters allotted.

As shown in FIGS. 1 to 9, a syringe with safety mechanism 1 includes a syringe 100, a needle 200, a needle cap 300, a holder 400, and a needle cover 500. When this syringe with safety mechanism 1 is used, needle cap 300 is removed therefrom, and after use, needle cover 500 is moved from a use position (a position shown in FIG. 2) to a protection position (a position shown in FIG. 3), so that inadvertent prick or the like can be suppressed.

Syringe 100 includes a cylindrically formed barrel main body 110 and a needle holding portion 120 connected to a tip end portion (an upper end portion in FIG. 5) of barrel main body 110. Each figure does not show a plunger and a gasket.

Needle holding portion 120 is smaller in outer geometry than barrel main body 110. Needle holding portion 120 holds needle 200. As shown in FIGS. 5 to 8, a tip end portion 122 of the needle holding portion is in a shape extending in a radially outward direction of barrel main body 110.

Needle cap 300 is attached to syringe 100 to cover needle 200. Specifically, needle cap 300 has an opening end portion 310 (see FIG. 5) fitted to tip end portion 122 of needle holding portion 120. Needle cap 300 is removable from syringe 100.

Holder 400 is fixed to needle holding portion 120 of syringe 100. Holder 400 is not displaceable relatively with respect to barrel main body 110 in an axial direction of barrel main body 110 but relatively rotatable with respect to barrel main body 110 around a central axis of barrel main body 110. Holder 400 includes a surrounding cylinder 410, a neck portion 420, a locking cylinder 430, and a guide protrusion 440.

Figure 9:
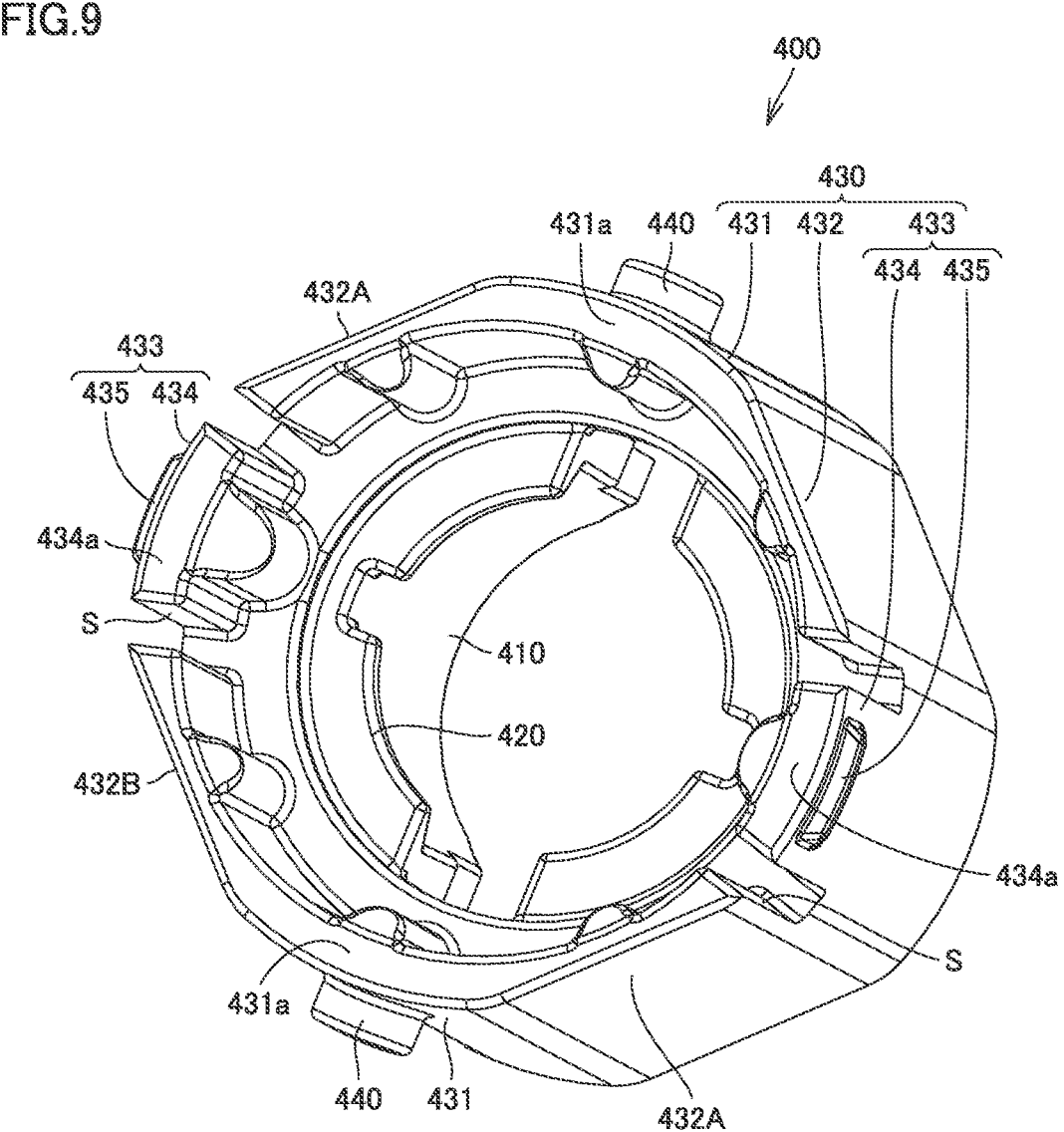
FIG. 9 is a perspective view of a holder.

Surrounding cylinder 410 surrounds needle holding portion 120. Surrounding cylinder 410 is cylindrically formed. Surrounding cylinder 410 is rotatable relatively with respect to needle holding portion 120 around the central axis of barrel main body 110. As shown in FIG. 9, a notch that extends in the axial direction of surrounding cylinder 410 is provided in surrounding cylinder 410.

Neck portion 420 is in a shape protruding in the radially inward direction of surrounding cylinder 410 from the tip end portion (the upper end portion in FIG. 5) of surrounding cylinder 410. Neck portion 420 is engaged with tip end portion 122 of needle holding portion 120. Detachment of holder 400 from barrel main body 110 is thus prevented.

Figure 5:
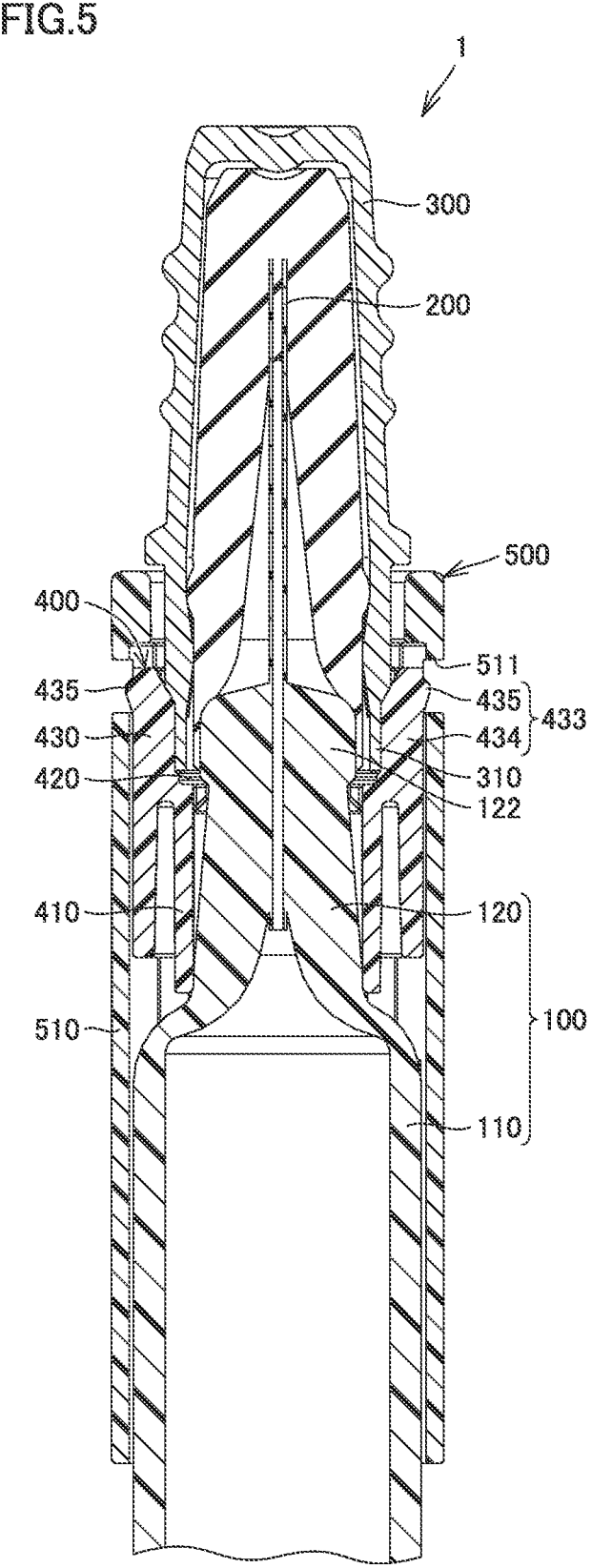
FIG. 5 is a cross-sectional view of the syringe with safety mechanism shown in FIG. 1.
Figure 6:
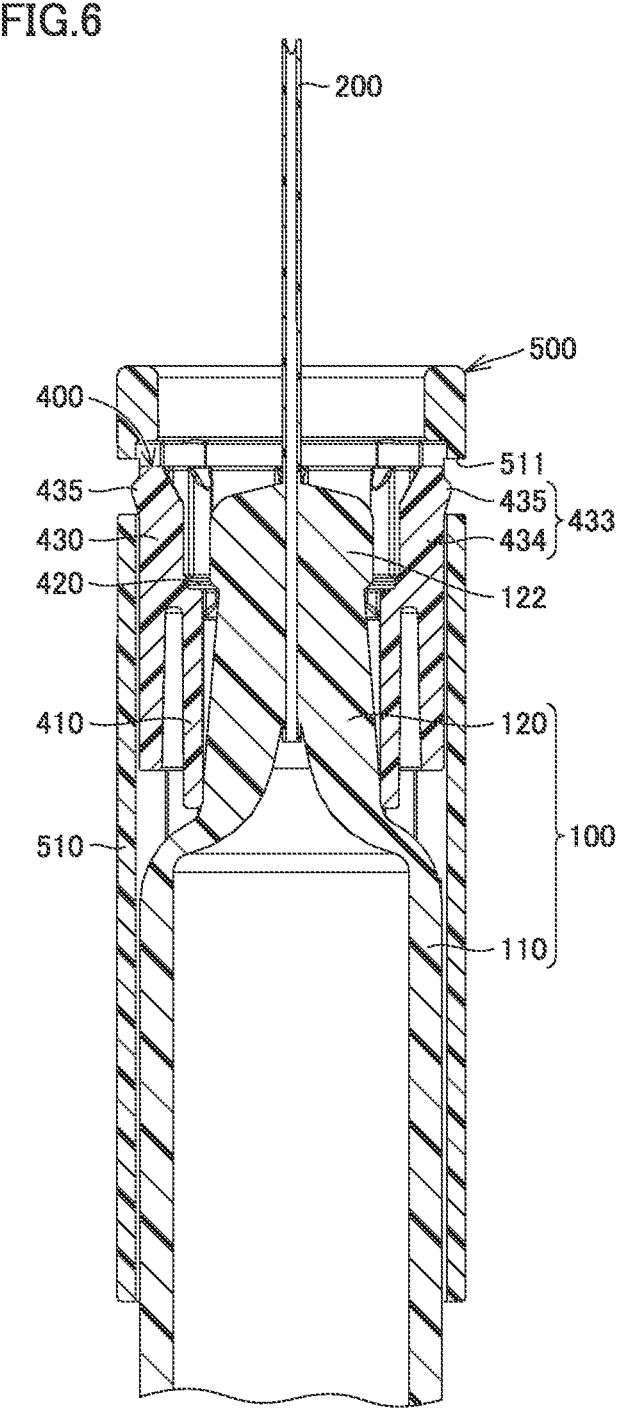
FIG. 6 is a cross-sectional view of a state where the cap has been removed as compared with FIG. 5.
Figure 7:
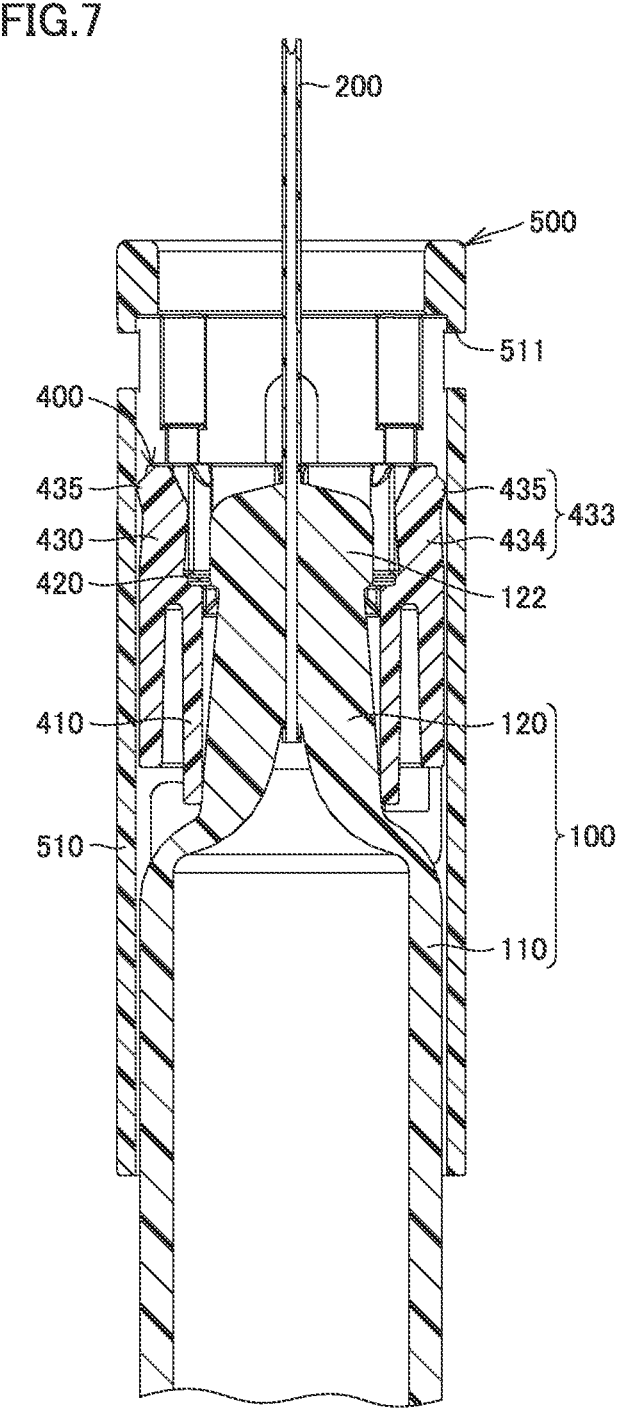
FIG. 7 is a cross-sectional view showing a state of slight displacement toward a needle cover protection position as compared with FIG. 6.
Figure 8:
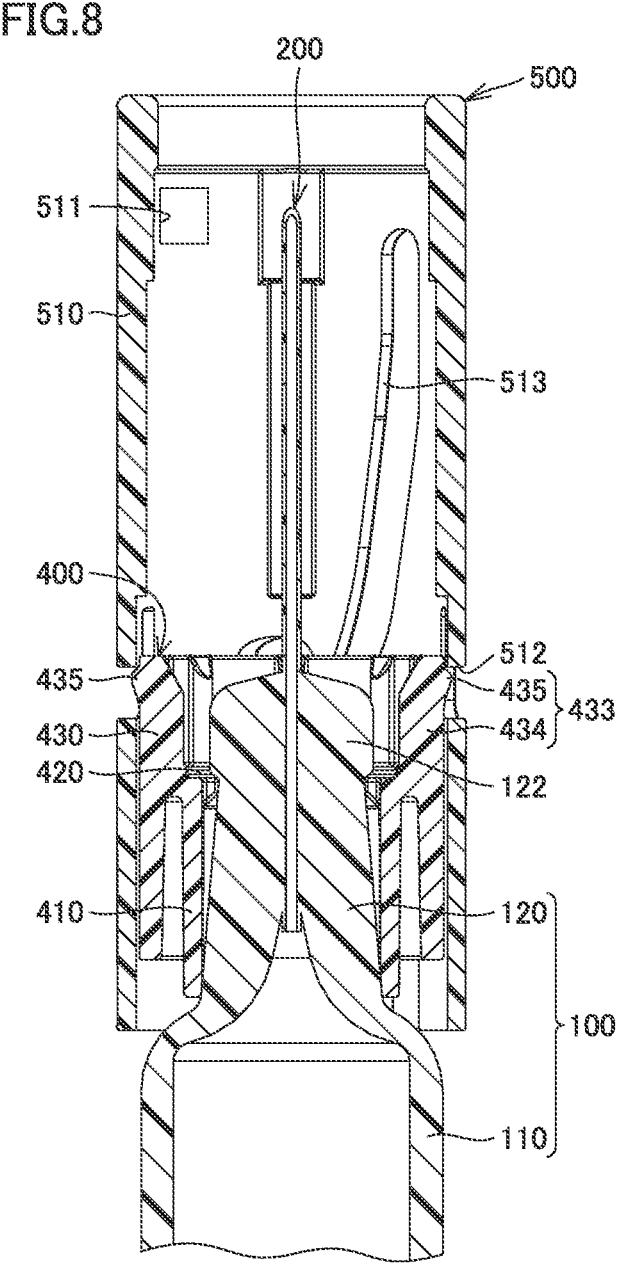
FIG. 8 is a cross-sectional view of a state where the needle cover is located at the protection position.

Locking cylinder 430 is a portion that locks needle cover 500. Locking cylinder 430 is formed on an outer side of surrounding cylinder 410 in the radial direction of surrounding cylinder 410. Locking cylinder 430 is in a shape that extends toward one side and the other side in the axial direction of surrounding cylinder 410 from an outer peripheral portion of neck portion 420. As shown in FIG. 5, locking cylinder 430 surrounds opening end portion 310 of needle cap 300. Opening end portion 310 is pressed into locking cylinder 430. Details of locking cylinder 430 will be described later.

Guide protrusion 440 is in a shape protruding in the radially outward direction of surrounding cylinder 410 from an outer circumferential surface of locking cylinder 430. Guide protrusion 440 is formed like a disc or a column. In the present embodiment, holder 400 includes a pair of guide protrusions 440 provided at positions between which the center of surrounding cylinder 410 lies.

Needle cover 500 is displaceable relatively with respect to syringe 100 along the axial direction of syringe 100 from the use position (the position shown in FIG. 2) where needle 200 is exposed toward the protection position (the position shown in FIG. 3) where needle 200 is surrounded. More specifically, needle cover 500 is displaceable relatively with respect to barrel main body 110 from the use position toward the protection position while needle cap 300 is not attached to syringe 100. On the other hand, displacement of needle cover 500 along the axial direction of barrel main body 110 from the protection position toward the use position is restricted. Needle cover 500 includes a cover main body 510 and an expansion portion 520.

Cover main body 510 is cylindrically formed. Cover main body 510 has an inner diameter as large as or slightly larger than an outer diameter of barrel main body 110. Cover main body 510 surrounds locking cylinder 430. Cover main body 510 includes a use position engagement portion 511, a protection position engagement portion 512, and a guide groove 513.

Use position engagement portion 511 is a portion where cover main body 510 is engaged with locking cylinder 430 at the use position. In the present embodiment, use position engagement portion 511 is provided as a through hole that passes through cover main body 510 in the radial direction thereof. Use position engagement portion 511 is provided in the vicinity of the tip end portion of cover main body 510 in an orientation (which is denoted as a "direction of protection" below) in which cover main body 510 moves from the use position toward the protection position.

Protection position engagement portion 512 is a portion where cover main body 510 is engaged with locking cylinder 430 at the protection position. In the present embodiment, protection position engagement portion 512 is provided as a through hole that passes through cover main body 510 in the radial direction thereof. Protection position engagement portion 512 is provided at a portion of cover main body 510 distant from use position engagement portion 511 in an orientation opposite to the direction of protection.

Guide groove 513 guides guide protrusion 440 when cover main body 510 is displaced from the use position toward the protection position. In other words, guide protrusion 440 is in a shape protruding toward needle cover 500, and moves within guide groove 513 when cover main body 510 is displaced from the use position to the protection position. Guide groove 513 is provided as a through hole that passes through cover main body 510 in the radial direction thereof. Guide groove 513 includes a guide surface 513*a* and an abutment surface 513*b*.

Guide surface 513*a* is in a shape that causes cover main body 510 to rotate around the central axis of barrel main body 110 when cover main body 510 is displaced from the use position to the protection position. In the present embodiment, guide surface 513*a* is in a shape that causes cover main body 510 to rotate by forty-five degrees around the central axis of barrel main body 110 when cover main body 510 is displaced from the use position to the protection position.

Figure 4:
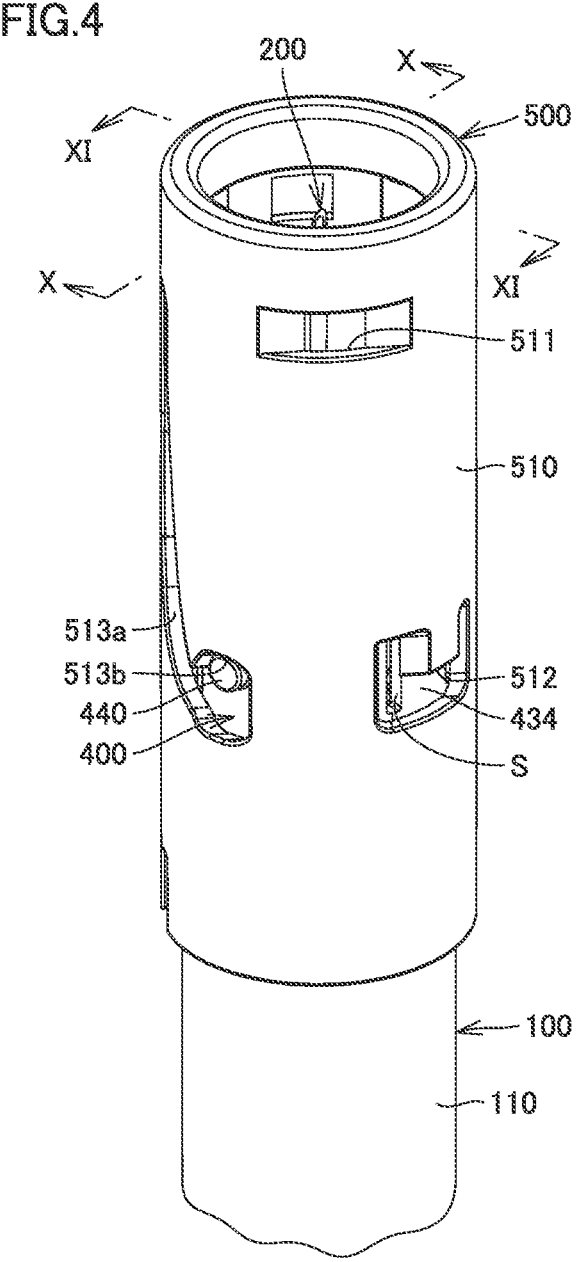
FIG. 4 is a perspective view in a state where a guide protrusion abuts on an abutment surface.
Figure 10:
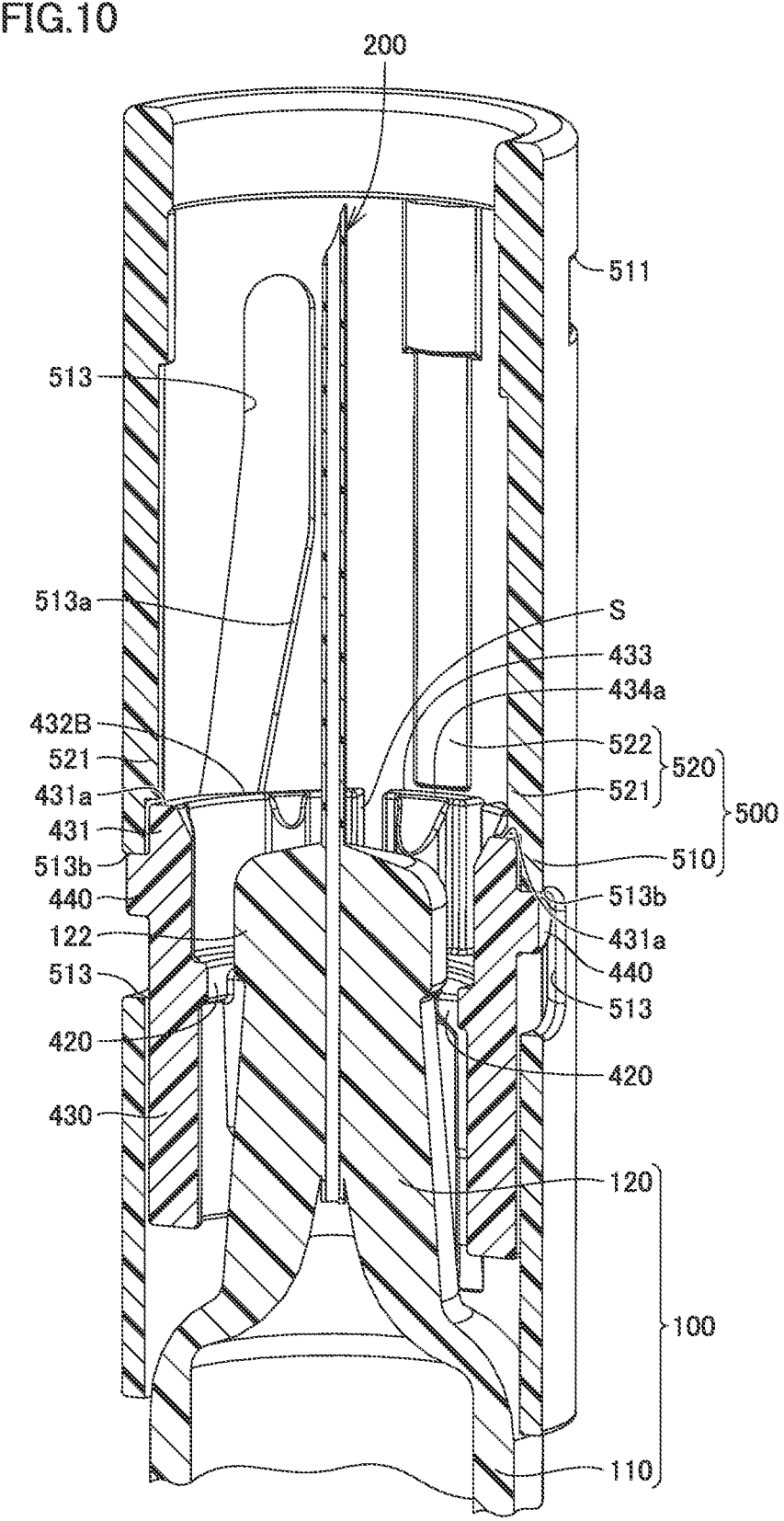
FIG. 10 is a cross-sectional view along the line X-X shown in FIG. 4.

As shown in FIGS. 4 and 10, abutment surface 513*b* abuts on guide protrusion 440 when cover main body 510 is displaced from the protection position toward the use position along the axial direction of barrel main body 110. Therefore, displacement of cover main body 510 from the protection position toward the use position along the axial direction of barrel main body 110 is restricted. In other words, guide protrusion 440 constitutes the protruding portion that protrudes toward needle cover 500 and abutment surface 513*b* constitutes the restriction portion that restricts relative displacement of cover main body 510 with respect to barrel main body 110 from the protection position toward the use position along the axial direction of barrel main body 110. While guide protrusion 440 abuts on abutment surface 513*b* (a state shown in FIGS. 4, 10, and 11), needle 200 is surrounded by needle cover 500.

Expansion portion 520 is in a shape that expands in the radially inward direction of cover main body 510 from an inner circumferential surface of cover main body 510. Expansion portion 520 includes a first longitudinal rib 521 and a second longitudinal rib 522.

Figure 13:
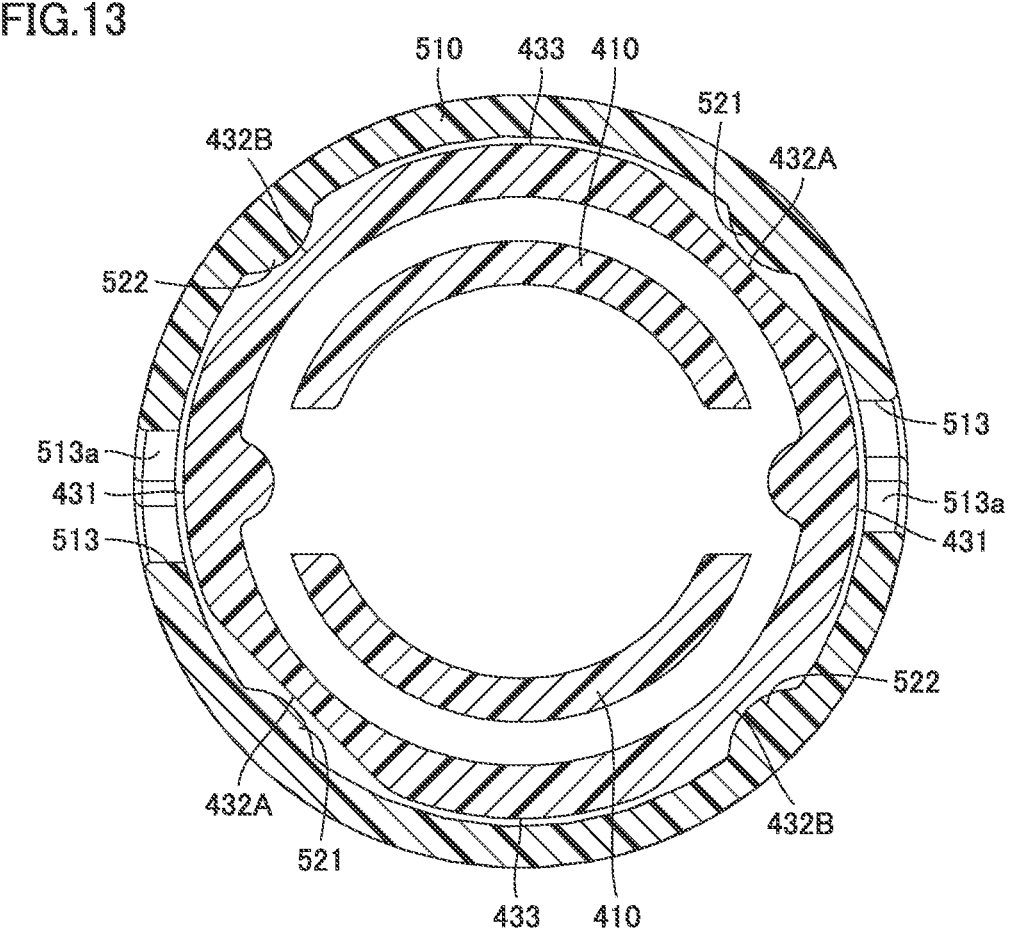
FIG. 13 is a cross-sectional view along the line XIII-XIII in FIG. 12.

As shown in FIG. 10, first longitudinal rib 521 is provided at a position distant from abutment surface 513*b* in the direction of protection (upward in FIG. 10). First longitudinal rib 521 is in a shape extending along the axial direction of cover main body 510. As shown in FIGS. 10 and 13, expansion portion 520 includes a pair of first longitudinal ribs 521 provided at positions between which the central axis of cover main body 510 lies.

Figure 11:
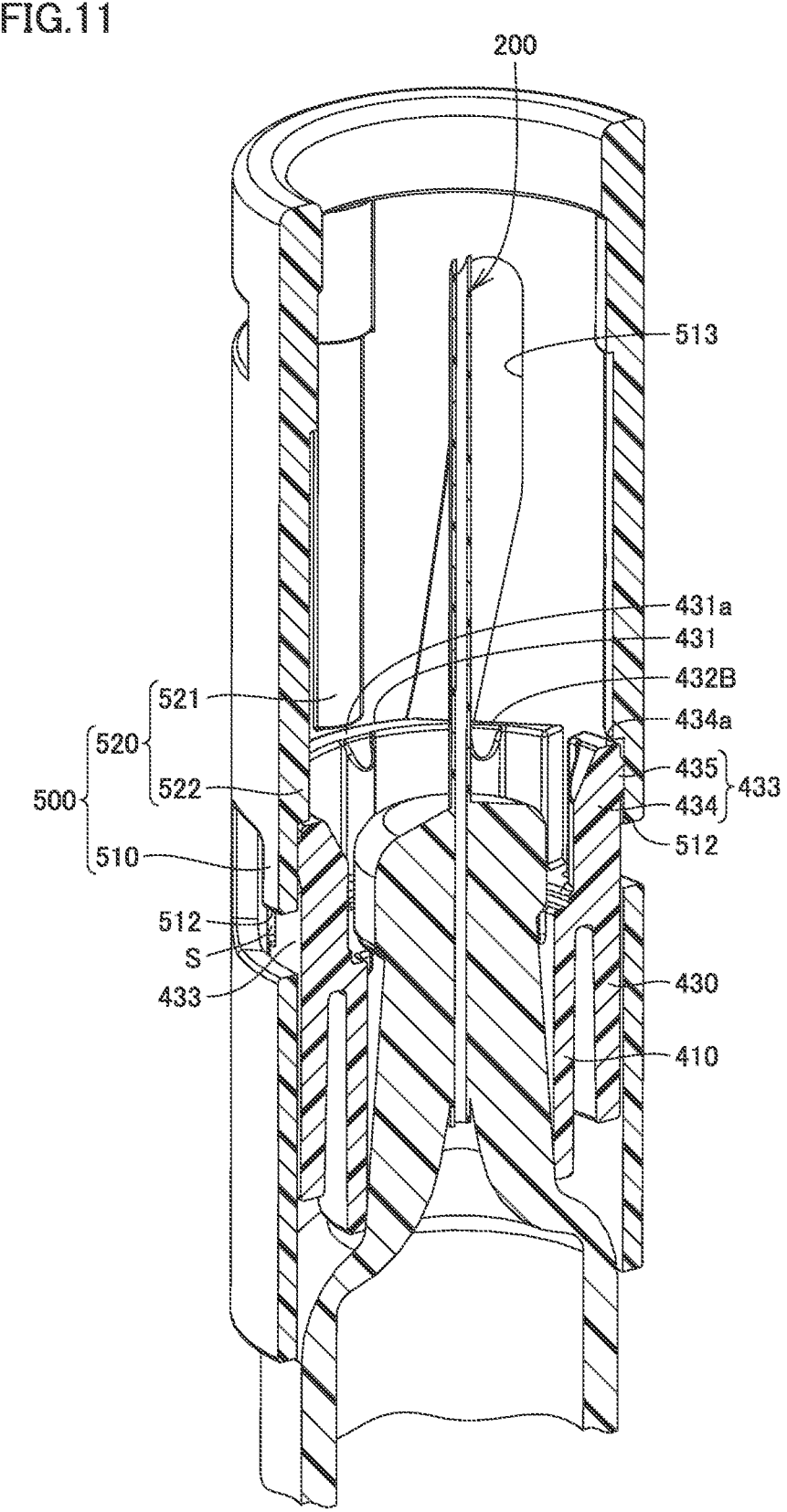
FIG. 11 is a cross-sectional view along the line XI-XI shown in FIG. 4.

As shown in FIG. 11, second longitudinal rib 522 is provided at a position distant from protection position engagement portion 512 in the direction of protection (upward in FIG. 11). Second longitudinal rib 522 is in a shape extending along the axial direction of cover main body 510. Second longitudinal rib 522 is provided at a position turned by ninety degrees from first longitudinal rib 521 in the circumferential direction of cover main body 510. As shown in FIGS. 11 and 13, expansion portion 520 includes a pair of second longitudinal ribs 522 provided at positions between which the central axis of cover main body 510 lies.

Locking cylinder 430 will now be described. As shown in FIG. 9, locking cylinder 430 includes a first wall portion 432, a second wall portion 431, and a locking portion 433.

First wall portion 432 is formed at a position opposed to expansion portion 520 at the use position in the radial direction of needle cover 500. In the present embodiment, locking cylinder 430 includes four first wall portions 432 provided at ninety-degree intervals along the circumferential direction of surrounding cylinder 410. First wall portion 432 opposed to first longitudinal rib 521 of needle cover 500 at the use position in the radial direction of needle cover 500 may be denoted as a "first wall portion 432A" and first wall portion 432 opposed to second longitudinal rib 522 of needle cover 500 at the use position in the radial direction of needle cover 500 may be denoted as a "first wall portion 432B" below.

Figure 12:
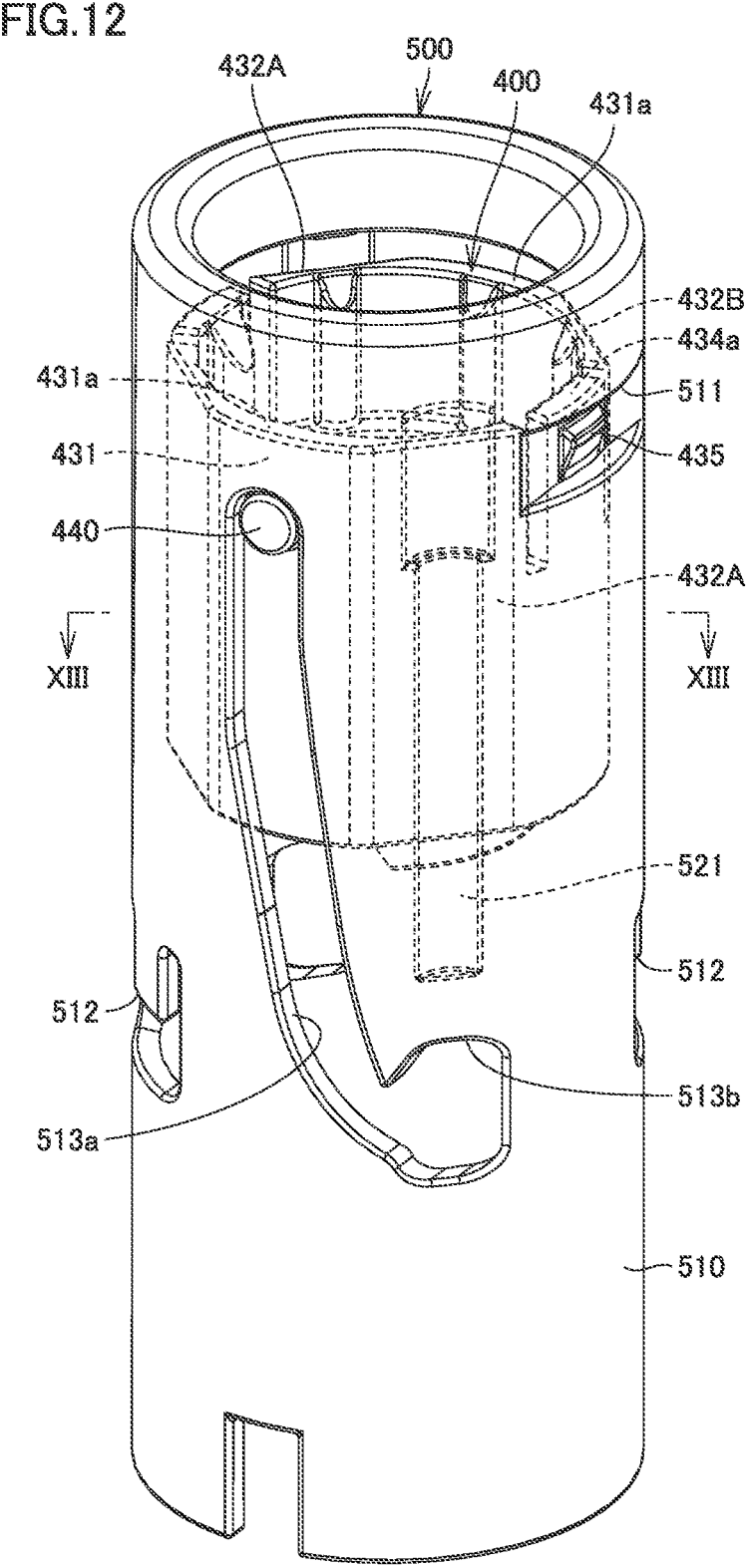
FIG. 12 is a perspective view of the holder and the needle cover in a state where the needle cover is located at a use position.
Figure 14:
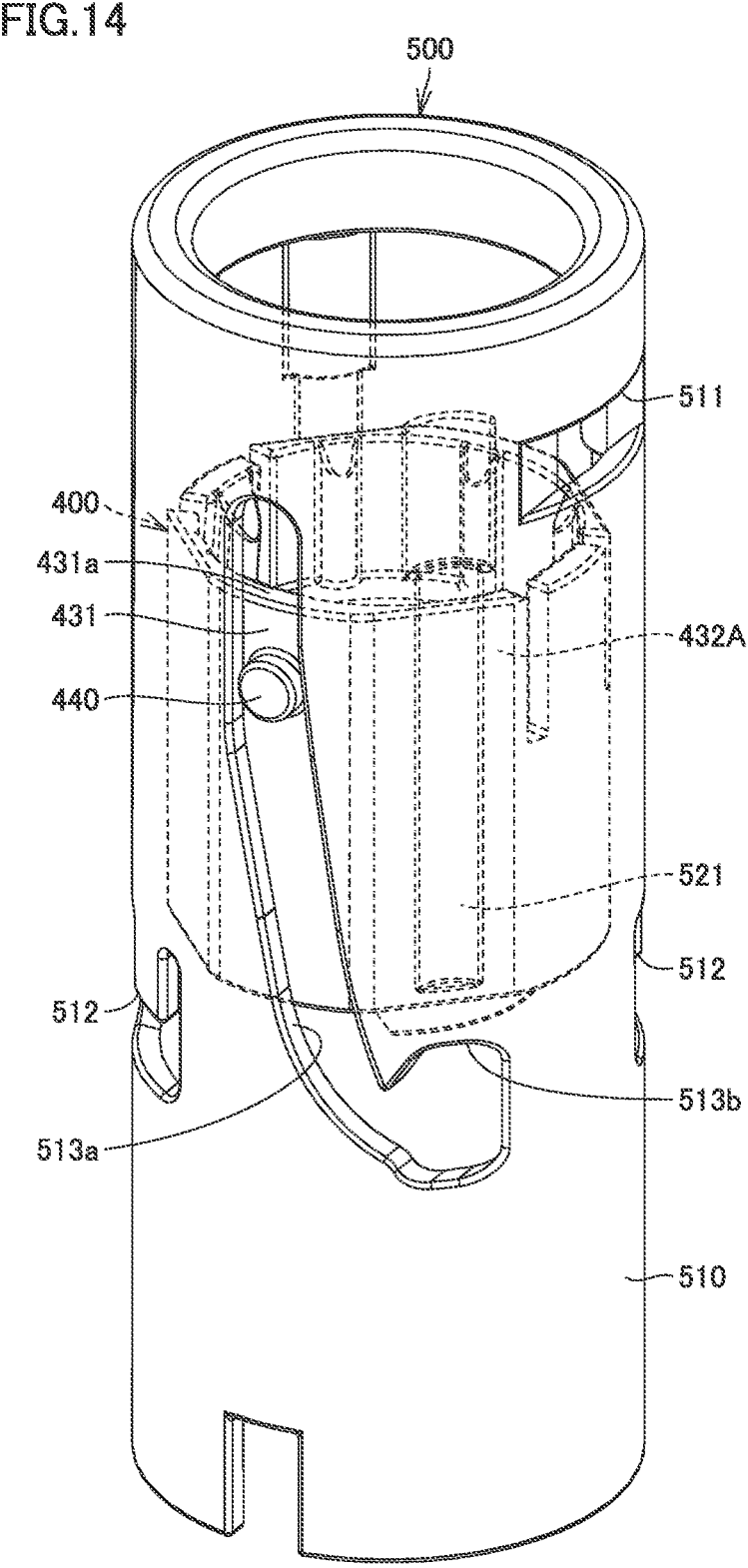
FIG. 14 is a perspective view showing a state of slight displacement of the needle cover toward the protection position from the state shown in FIG. 12.
Figure 15:
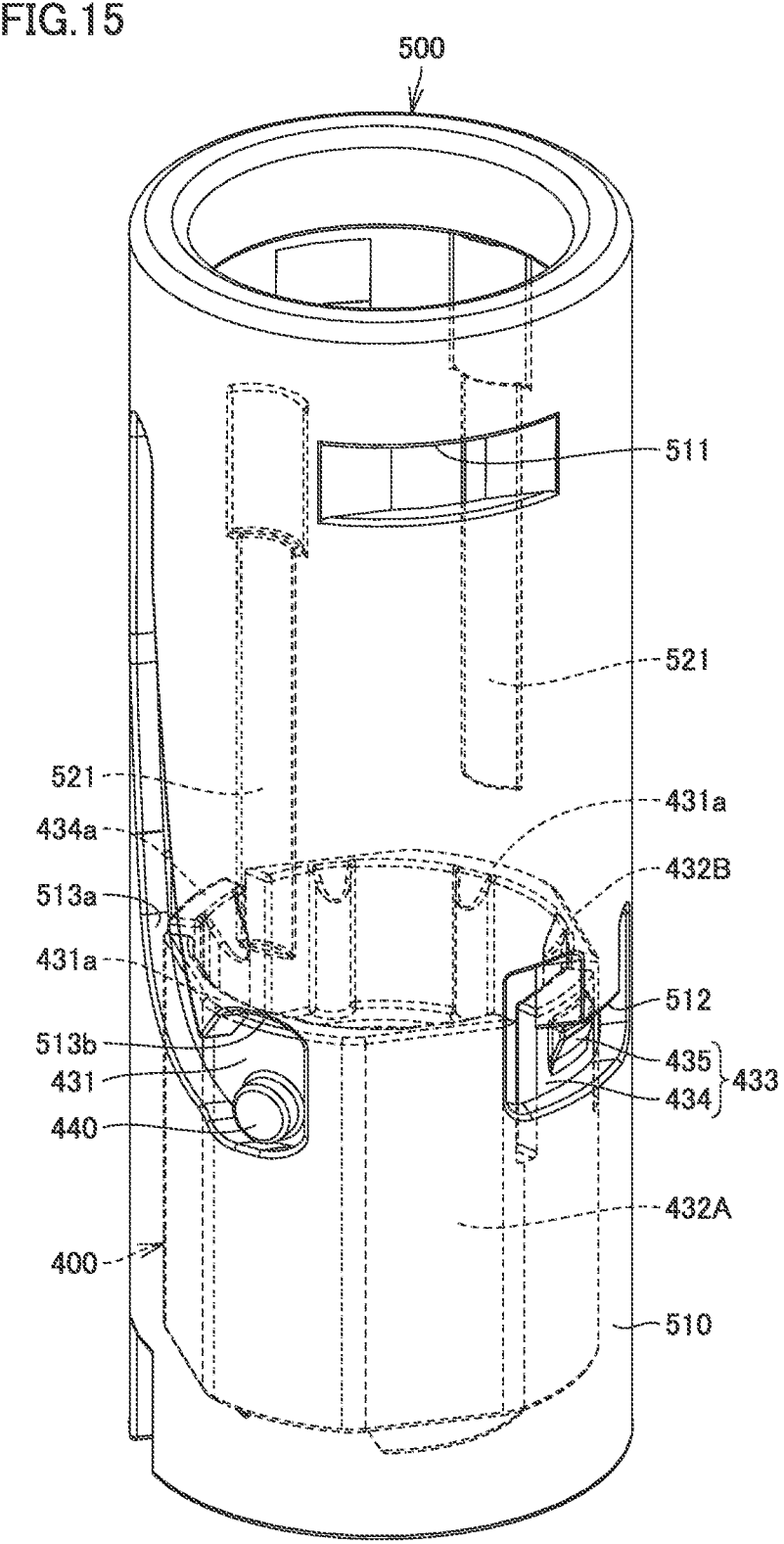
FIG. 15 is a perspective view of the holder and the needle cover in a state where the needle cover is located at the protection position.

Each first wall portion 432 allows displacement of needle cover 500 from the use position toward the protection position while it rotates around the central axis of barrel main body 110. An outer surface of each first wall portion 432 is formed as being flat. As shown in FIG. 13, a gap is provided between first longitudinal rib 521 of needle cover 500 at the use position and first wall portion 432A opposed thereto. A gap is provided between second longitudinal rib 522 of needle cover 500 at the use position and first wall portion 432B opposed thereto. Therefore, as shown in FIGS. 12 to 15, displacement of needle cover 500 from the use position toward the protection position while it rotates around the central axis of barrel main body 110 is allowed. FIGS. 12, 14, and 15 show only first longitudinal rib 521 of expansion portion 520. FIG. 14 does not show a locking protrusion 435.

Second wall portion 431 is provided between adjacent first wall portions 432. In other words, locking cylinder 430 includes a pair of second wall portions 431 between which the center of surrounding cylinder 410 lies. More specifically, each second wall portion 431 is provided at a position adjacent to first wall portion 432A (first wall portion 432 opposed in the radial direction to first longitudinal rib 521 at the use position) in a direction the same as a direction of rotation of needle cover 500 around the central axis of barrel main body 110 when needle cover 500 is displaced from the use position to the protection position. Each second wall portion 431 is larger in thickness than first wall portion 432.

Each second wall portion 431 includes a receiving portion 431a formed at a tip end in the direction of protection. Receiving portion 431a is opposed in the axial direction to first longitudinal rib 521 of needle cover 500 at the protection position and abuts on first longitudinal rib 521 when needle cover 500 is displaced from the protection position toward the use position along the axial direction. In other words, first longitudinal rib 521 constitutes the protruding portion that protrudes toward holder 400 and receiving portion 431a constitutes the restriction portion that restricts relative displacement of needle cover 500 with respect to barrel main body 110 from the protection position toward the use position along the axial direction of barrel main body 110.

Locking portion 433 locks needle cover 500 from the radially inner side of needle cover 500. Locking portion 433 holds needle cover 500 at the use position. Specifically, locking portion 433 is engaged with use position engagement portion 511 of needle cover 500 at the use position. Locking portion 433 holds needle cover 500 at the protection position. Specifically, locking portion 433 is engaged with protection position engagement portion 512 of needle cover 500 at the protection position.

Locking portion 433 is provided between adjacent first wall portions 432. In other words, locking cylinder 430 includes a pair of locking portions 433 between which the center of surrounding cylinder 410 lies. More specifically, each locking portion 433 is provided at a position adjacent to first wall portion 432B (first wall portion 432 opposed in the radial direction to second longitudinal rib 522 at the use position) in a direction the same as the direction of rotation of needle cover 500 around the central axis of barrel main body 110 when needle cover 500 is displaced from the use position to the protection position.

A pair of slits S is provided on opposing sides of each locking portion 433 of locking cylinder 430. Each locking portion 433 can thus be bent in the radially inward direction of surrounding cylinder 410. Locking portion 433 includes a flexible piece 434 and locking protrusion 435.

Flexible piece 434 lies between the pair of slits S and formed like a plate.

Locking protrusion 435 is in a shape protruding radially outward from an outer surface of flexible piece 434. Locking protrusion 435 is engaged with use position engagement portion 511 and protection position engagement portion 512 from the radially inner side of needle cover 500. Locking protrusion 435 is provided on an outer surface of a tip end portion of flexible piece 434 in the direction of protection.

Flexible piece 434 is elastically deformable such that locking protrusion 435 is displaced between an engagement position and a detachment position. The engagement position refers to a position (a position shown in FIG. 6) where locking protrusion 435 is engaged with use position engagement portion 511 while needle cover 500 is located at the use position. The detachment position refers to a position (a position shown in FIG. 7) where locking protrusion 435 is detached radially inward from use position engagement portion 511 when needle cover 500 is displaced from the use position to the protection position.

As shown in FIGS. 9 to 11, flexible piece 434 includes a receiving portion 434a formed at a tip end in the direction of protection. Receiving portion 434a is opposed in the axial direction to second longitudinal rib 522 of needle cover 500 at the protection position and abuts on second longitudinal rib 522 when needle cover 500 is displaced from the protection position toward the use position along the axial direction. In other words, second longitudinal rib 522 constitutes the protruding portion that protrudes toward holder 400 and receiving portion 434a constitutes the restriction portion that restricts relative displacement of needle cover 500 with respect to barrel main body 110 along the axial direction of barrel main body 110 from the protection position toward the use position.

As shown in FIG. 5, while needle cap 300 is attached to syringe 100, opening end portion 310 of needle cap 300 is pressed in between tip end portion 122 of needle holding portion 120 and flexible piece 434. In other words, opening end portion 310 constitutes a support portion that supports locking portion 433 from the radially inner side to restrict radially inward bending of locking portion 433.

A procedure of use of syringe with safety mechanism 1 will now be described. Initially, before this syringe with safety mechanism 1 is used, as shown in FIGS. 1 and 5, needle cap 300 is attached to syringe 100. In this state, opening end portion (support portion) 310 of needle cap 300 supports locking portion 433 from the radially inner side. Therefore, radially inward bending of locking portion 433 is suppressed. Therefore, while needle cap 300 is attached to syringe 100, needle cover 500 is held at the use position. In other words, with this syringe with safety mechanism 1, displacement of needle cover 500 to the protection position before removal of needle cap 300 is restricted.

At the time of use of syringe with safety mechanism 1, needle cap 300 is removed. Needle 200 is thus exposed.

Then, after use, needle cover 500 is moved from the use position toward the protection position with respect to barrel main body 110. When this movement is started, there is no support of locking portion 433 by opening end portion 310 of needle cap 300. Therefore, locking protrusion 435 is pressed by cover main body 510, and flexible piece 434 is bent radially inward. Therefore, movement of needle cover 500 in the direction of protection is allowed. Needle cover 500 moves to the protection position while it rotates around the central axis of barrel main body 110 along guide groove 513. When needle cover 500 moves as rotating, first longitudinal rib 521 is maintained distant from first wall portion 432A and second longitudinal rib 522 is maintained distant from first wall portion 432B.

Then, when needle cover 500 reaches the protection position, flexible piece 434 returns such that locking protrusion 435 is engaged with protection position engagement portion 512. Therefore, needle cover 500 is held at the protection position. At this time, as shown in FIG. 15, first longitudinal rib 521 is opposed in the axial direction to receiving portion 431a of second wall portion 431. Second longitudinal rib 522 is opposed in the axial direction to receiving portion 434a of flexible piece 434.

Figure 16:
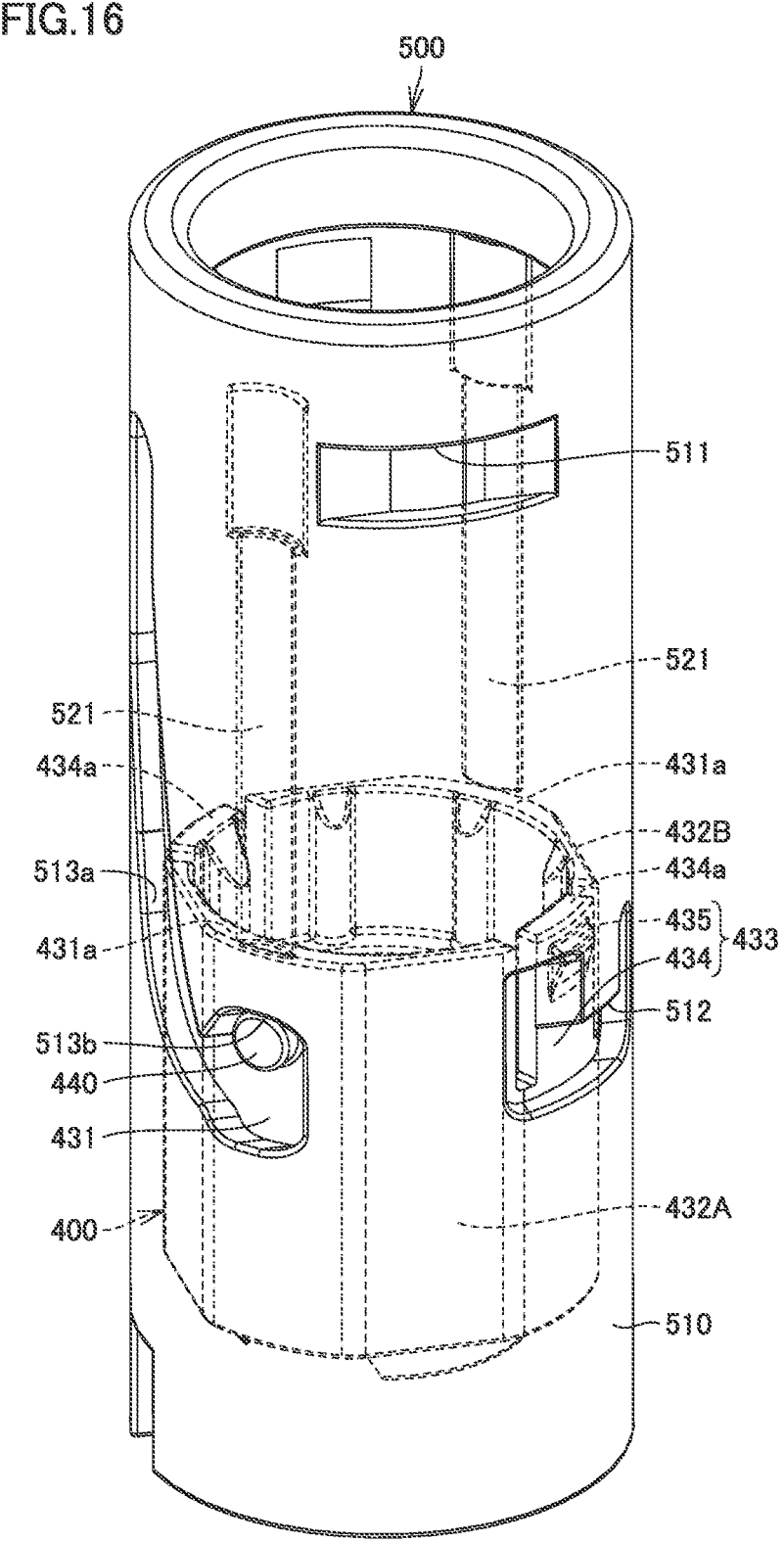
FIG. 16 is a perspective view showing a state of displacement of the needle cover toward the use position along an axial direction from the state shown in FIG. 15.

When external force that causes needle cover 500 to move from the protection position to the use position along the axial direction of barrel main body 110 is applied to needle cover 500, as shown in FIGS. 4, 10, and 16, guide protrusion 440 abuts on abutment surface 513b, first longitudinal rib 521 abuts on receiving portion 431a of second wall portion 431, and second longitudinal rib 522 abuts on receiving portion 434a of flexible piece 434. Therefore, further displacement of needle cap 500 in an orientation opposite to the direction of protection along the axial direction of barrel main body 110 is restricted. FIG. 16 does not show second longitudinal rib 522.

Thus, while the protruding portion (guide protrusion 440, first longitudinal rib 521, second longitudinal rib 522) abuts on the restriction portion (abutment surface 513b, receiving portion 431a, receiving portion 434a), needle 200 is surrounded by needle cover 500. Therefore, occurrence of inadvertent prick or the like after use is suppressed.

In the present embodiment, locking portion 433 performs both of a function to lock needle cover 500 at the use position or the protection position and a function to restrict displacement of needle cover 500 from the protection position toward the use position along the axial direction by being in coordination with second longitudinal rib 522.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

For example, displacement of needle cap 500 with respect to syringe 100 from the protection position toward the use position along the axial direction can be restricted by a restriction mechanism composed of a single protruding portion and a single restriction portion. Therefore, any one or two of a restriction mechanism composed of guide protrusion 440 and abutment surface 513b, a restriction mechanism composed of first longitudinal rib 521 and receiving portion 431a, and a restriction mechanism composed of second longitudinal rib 522 and receiving portion 434a may be omitted.

An illustrative embodiment described above is understood by a person skilled in the art as a specific example of aspects below.

A syringe with safety mechanism according to one aspect of this invention includes a syringe, a needle connected to a tip end portion of the syringe, a holder fixed to the syringe, and a needle cover displaceable relatively with respect to the syringe along an axial direction of the syringe from a use position where the needle is exposed toward a protection position where the needle is surrounded, the holder includes a locking portion that locks the needle cover at the use position from a radially inner side of the needle cover to hold the needle cover at the use position and locks the needle cover at the protection position from the radially inner side to hold the needle cover at the protection position, and at least one member of the holder and the needle cover includes a protruding portion that protrudes toward the other member of the holder and the needle cover and the other member includes a restriction portion that abuts on the protruding portion to restrict relative displacement of the needle cover with respect to the syringe along the axial direction of the syringe from the protection position toward the use position.

In this syringe with safety mechanism, at least one member of the holder and the needle cover includes the protruding portion and the other member includes the restriction portion. Therefore, the protruding portion abuts on the restriction portion when the needle cover is relatively displaced with respect to the syringe from the protection position toward the use position along the axial direction of the syringe. Therefore, displacement of the needle cover from the protection position to the use position is suppressed.

In the syringe with safety mechanism, the holder may include a guide protrusion in a shape protruding toward the needle cover, the needle cover may be provided with a guide groove that guides the guide protrusion when the needle cover is displaced from the use position toward the protection position, the guide groove may include a guide surface in a shape that causes the needle cover to rotate around a central axis of the syringe when the needle cover is displaced from the use position to the protection position and an abutment surface that abuts on the guide protrusion when the needle cover is displaced from the protection position toward the use position along the axial direction, and the guide protrusion may constitute the protruding portion and the abutment surface may constitute the restriction portion.

In this aspect, the guide protrusion achieves both of stable movement of the needle cover from the use position to the protection position and suppression of displacement of the needle cover from the protection position to the use position.

Alternatively, in the syringe with safety mechanism, the needle cover may include an expansion portion that expands toward the holder, the holder may include a receiving portion that is opposed in the axial direction to the expansion portion of the needle cover at the protection position and abuts on the expansion portion when the needle cover is displaced from the protection position toward the use position along the axial direction, and the expansion portion may constitute the protruding portion and the receiving portion may constitute the restriction portion.

In this case, preferably, the holder includes a guide protrusion in a shape protruding toward the needle cover, the needle cover is provided with a guide groove that guides the guide protrusion when the needle cover is displaced from the use position toward the protection position, the guide groove includes a guide surface in a shape that causes the needle cover to rotate around a central axis of the syringe when the needle cover is displaced from the use position to the protection position, the holder includes a first wall portion formed at a position where the first wall portion is opposed to the expansion portion of the needle cover at the use position in a radial direction of the needle cover, the first wall portion allowing displacement of the needle cover from the use position toward the protection position while the needle cover rotates around the central axis of the syringe and a second wall portion provided at a position adjacent to the first wall portion in a direction identical to a direction of rotation of the needle cover around the central axis of the syringe when the needle cover is displaced from the use position to the protection position, and a tip end portion of the second wall portion in an orientation in which the needle cover moves from the use position toward the protection position constitutes the receiving portion.

In this aspect, both of smooth movement of the needle cover from the use position to the protection position and suppression of displacement of the needle cover from the protection position to the use position are achieved.

Further in this case, preferably, the holder further includes another first wall portion different from the first wall portion, the locking portion is provided at a position adjacent to another first wall portion in the direction identical to the direction of rotation of the needle cover around the central axis of the syringe when the needle cover is displaced from the use position to the protection position, the expansion portion includes a first longitudinal rib opposed to the first wall portion in the radial direction of the needle cover when the needle cover is located at the use position and opposed to the second wall portion in the axial direction when the needle cover is located at the protection position and a second longitudinal rib opposed to another first wall portion in the radial direction of the needle cover when the needle cover is located at the use position and opposed to the locking portion in the axial direction when the needle cover is located at the protection position, and a tip end portion of the locking portion in the orientation in which the needle cover moves from the use position toward the protection position constitutes the receiving portion.

Displacement of the needle cover from the protection position to the use position is thus more reliably suppressed.

Preferably, the guide groove further includes an abutment surface that abuts on the guide protrusion when the needle cover is displaced from the protection position toward the use position along the axial direction, and the guide protrusion constitutes the protruding portion and the abutment surface constitutes the restriction portion.

As set forth above, according to the syringe with safety mechanism according to the one aspect of this invention, displacement of the needle cover from the protection position to the use position is suppressed.

A syringe with safety mechanism according to another aspect of this invention includes a syringe, a needle connected to a tip end portion of the syringe, a needle cap attached to the syringe to cover the needle, the needle cap being removable from the syringe, a holder fixed to the syringe, and a needle cover displaceable relatively with respect to the syringe along an axial direction of the syringe from a use position where the needle is exposed while the needle cap is not attached to the syringe toward a protection position where the needle is surrounded while the needle cap is not attached to the syringe, the holder includes a locking portion that locks the needle cover at the use position from a radially inner side of the needle cover to hold the needle cover at the use position, the locking portion is elastically deformable to be bent radially inward to allow movement of the needle cover from the use position to the protection position, and the needle cap includes a support portion that supports the locking portion from the radially inner side to restrict radially inward bending of the locking portion.

With this syringe with safety mechanism, while the needle cap is attached to the syringe, the support portion of the needle cap supports the locking portion from the radially inner side. Therefore, radially inward bending of the locking portion is suppressed. Therefore, while the needle cap is attached to the syringe, the needle cover is held at the use position. In other words, with this syringe with safety mechanism, displacement of the needle cover to the protection position before removal of the needle cap is restricted. On the other hand, while the needle cap is not attached to the syringe, the locking portion can be bent radially inward, and hence displacement of the needle cover from the use position to the protection position is allowed.

Preferably, in the holder, on each of opposing sides of the locking portion in a circumferential direction of the holder, a slit that extends in a direction in parallel to the axial direction of the syringe is provided.

The locking portion is thus effectively elastically deformed when the needle cover is displaced from the use position to the protection position.

Preferably, the locking portion includes a flexible piece in a shape extending in the direction in parallel to the axial direction of the syringe and a locking protrusion in a shape protruding radially outward from the flexible piece, the needle cover includes a use position engagement portion engaged with the locking protrusion at the use position, and the flexible piece is elastically deformable such that the locking protrusion is displaced between an engagement position where the locking protrusion is engaged with the use position engagement portion while the needle cover is located at the use position and a detachment position where the locking protrusion is detached radially inward from the use position engagement portion when the needle cover is displaced from the use position to the protection position.

In this case, preferably, the needle cover further includes a protection position engagement portion engaged with the locking protrusion at the protection position.

Displacement of the needle cover from the protection position to the use position after use is thus suppressed.

As set forth above, according to the syringe with safety mechanism according to another aspect of this invention, sliding of the needle cover to the protection position before the needle cap is removed is restricted.

REFERENCE SIGNS LIST

1 syringe with safety mechanism; 100 syringe; 110 barrel main body; 120 needle holding portion; 122 tip end portion; 200 needle; 300 needle cap; 310 opening end portion (support portion); 400 holder; 410 surrounding cylinder; 420 neck portion; 430 locking cylinder; 431 second wall portion; 431*a* receiving portion (restriction portion); 432 first wall portion; 432A first wall portion; 432B first wall portion; 433 locking portion; 434 flexible piece; 434*a* receiving portion (restriction portion); 435 locking protrusion; 440 guide protrusion (protruding portion); 500 needle cover; 510 cover main body; 511 use position engagement portion; 512 protection position engagement portion; 513 guide groove; 513*a* guide surface; 513*b* abutment surface (restriction portion); 520 expansion portion (protruding portion); 521 first longitudinal rib (protruding portion); 522 second longitudinal rib (protruding portion)

The invention claimed is:

1. A syringe with safety mechanism comprising:
a syringe;
a needle connected to a tip end portion of the syringe;
a holder fixed to the syringe; and
a needle cover displaceable relatively with respect to the syringe along an axial direction of the syringe from a use position where the needle is exposed toward a protection position where the needle is surrounded, wherein
the holder includes a locking portion that locks the needle cover at the use position from a radially inner side of the needle cover to hold the needle cover at the use position and locks the needle cover at the protection position from the radially inner side to hold the needle cover at the protection position,
the needle cover includes an expansion portion that expands toward the holder,
the holder includes a receiving portion that is opposed in the axial direction to the expansion portion of the needle cover at the protection position and abuts on the expansion portion when the needle cover is displaced from the protection position toward the use position along the axial direction to thereby restrict relative displacement of the needle cover with respect to the syringe along the axial direction of the syringe from the protection position toward the use position,
the holder includes a guide protrusion in a shape protruding toward the needle cover,
the needle cover is provided with a guide groove that guides the guide protrusion when the needle cover is displaced from the use position toward the protection position,
the guide groove includes a guide surface in a shape that causes the needle cover to rotate around a central axis of the syringe when the needle cover is displaced from the use position to the protection position,
the holder includes
a first wall portion formed at a position where the first wall portion is opposed to the expansion portion of the needle cover at the use position in a radial direction of the needle cover, the first wall portion allowing displacement of the needle cover from the use position toward the protection position while the needle cover rotates around the central axis of the syringe, and
a second wall portion provided at a position adjacent to the first wall portion in a direction identical to a direction of rotation of the needle cover around the central axis of the syringe when the needle cover is displaced from the use position to the protection position, and
a tip end portion of the second wall portion in an orientation in which the needle cover moves from the use position toward the protection position constitutes the receiving portion.

2. The syringe with safety mechanism according to claim 1, wherein
the holder further includes another first wall portion different from the first wall portion,
the locking portion is provided at a position adjacent to the another first wall portion in a direction identical to the direction of rotation of the needle cover around the central axis of the syringe when the needle cover is displaced from the use position to the protection position,
the expansion portion includes
a first longitudinal rib opposed to the first wall portion in the radial direction of the needle cover when the needle cover is located at the use position and opposed to the second wall portion in the axial direction when the needle cover is located at the protection position, and
a second longitudinal rib opposed to the another first wall portion in the radial direction of the needle cover when the needle cover is located at the use position and opposed to the locking portion in the axial direction when the needle cover is located at the protection position, and
a tip end portion of the locking portion in the orientation in which the needle cover moves from the use position toward the protection position constitutes the receiving portion.

3. The syringe with safety mechanism according to claim 1, wherein
the guide groove further includes an abutment surface that abuts on the guide protrusion when the needle cover is displaced from the protection position toward the use position along the axial direction.

4. The syringe with safety mechanism according to claim 1, further comprising a needle cap attached to the syringe to cover the needle, the needle cap being removable from the syringe, wherein
the needle cover is displaceable relatively with respect to the syringe from the use position toward the protection position while the needle cap is not attached to the syringe,
the locking portion is elastically deformable to be bent radially inward to allow movement of the needle cover from the use position to the protection position, and
the needle cap includes a support portion that supports the locking portion from the radially inner side to restrict radially inward bending of the locking portion.

5. The syringe with safety mechanism according to claim 4, wherein
in the holder, on each of opposing sides of the locking portion in a circumferential direction of the holder, a slit that extends in a direction in parallel to the axial direction of the syringe is provided.

6. The syringe with safety mechanism according to claim 5, wherein
the locking portion includes
a flexible piece in a shape extending in the direction in parallel to the axial direction of the syringe, and
a locking protrusion in a shape protruding radially outward from the flexible piece,
the needle cover includes a use position engagement portion engaged with the locking protrusion at the use position, and the flexible piece is elastically deformable such that the locking protrusion is displaced between an engagement position where the locking protrusion is engaged with the use position engagement portion while the needle cover is located at the use position and a detachment position where the locking protrusion is detached radially inward from the use position engagement portion when the needle cover is displaced from the use position to the protection position.

7. The syringe with safety mechanism according to claim 6, wherein
the needle cover further includes a protection position engagement portion engaged with the locking protrusion at the protection position.

* * * * *